US010699329B2

(12) United States Patent
Zakula

(10) Patent No.: US 10,699,329 B2
(45) Date of Patent: Jun. 30, 2020

(54) SYSTEMS AND METHODS FOR DOCUMENT TO ORDER CONVERSION

(71) Applicant: Anthony Zakula, Peachtree City, GA (US)

(72) Inventor: Anthony Zakula, Peachtree City, GA (US)

(*) Notice: Subject to any disclaimer, the term of this patent is extended or adjusted under 35 U.S.C. 154(b) by 338 days.

(21) Appl. No.: 15/784,214

(22) Filed: Oct. 16, 2017

(65) Prior Publication Data

US 2019/0114691 A1 Apr. 18, 2019

(51) Int. Cl.
*G06Q 30/06* (2012.01)
*G06Q 10/10* (2012.01)

(52) U.S. Cl.
CPC ....... *G06Q 30/0635* (2013.01); *G06Q 10/107* (2013.01); *G06Q 30/0641* (2013.01)

(58) Field of Classification Search
CPC .............................. G06Q 30/06–08
USPC ............................. 705/26.1–27.2
See application file for complete search history.

(56) References Cited

U.S. PATENT DOCUMENTS

| 2005/0004885 | A1* | 1/2005 | Pandian | G06F 16/25 |
| 2005/0102192 | A1* | 5/2005 | Gerrits | G06Q 10/10 |
| | | | | 705/26.64 |
| 2005/0197915 | A1* | 9/2005 | Biwer | G06Q 30/0637 |
| | | | | 705/26.82 |
| 2007/0203928 | A1* | 8/2007 | Machiraju | G06F 40/103 |
| 2010/0250598 | A1* | 9/2010 | Brauer | G06F 16/319 |
| | | | | 707/780 |

OTHER PUBLICATIONS

Everything You Need to Know About Electronic Data Interchange, http://info.odysseydcs.com/blog/everything-you-need-to-know-about-electronic-data-interchange, James Lusk, Aug. 14, 2017 (Year: 2017).*

* cited by examiner

*Primary Examiner* — Ming Shui
(74) *Attorney, Agent, or Firm* — Georgiy L. Khayet

(57) ABSTRACT

Provided are methods and systems for processing customer orders. An example method can commence with receiving a customer document and converting the customer document into a text document. The method can further include analyzing the text document to determine at least one customer data field in the text document. The method can continue with matching the at least one customer data field to at least one order data field. The method can further include populating, based on the matching, the at least one order data field with at least one text value corresponding to the at least one customer data field. The method can continue with generating a purchase order document based on the at least one text value. The purchase order document can include at least one product corresponding to the at least one order data field.

20 Claims, 5 Drawing Sheets

SYSTEMS AND METHODS FOR DOCUMENT TO ORDER CONVERSION

TECHNICAL FIELD

The present application relates generally to data processing, and, more specifically, to systems and methods for processing customer orders.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A vendor can receive a large number of electronic and physical documents. Some of these documents can include purchase order information. Once the documents are received, the purchasing information needs to be processed and uploaded to the vendor system.

Order documents generated by the vendor system can be complex forms with multiple data fields. However, purchase documents received from customers can be in a variety of formats which rarely correspond to the format used by the vendor system. This means that, upon receipt of an order document, the order data has to be manually processed and entered into the vendor system. This process is time consuming and inefficient.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present disclosure relates to systems and methods for processing customer orders. According to one example embodiment of the present disclosure, a system for processing customer orders is provided. The system can include a customer interface, a converting module, a processing module, a data population module, and a purchase order generation module. The customer interface can be configured to receive a customer document. The converting module can be configured to convert the customer document into a text document. The processing module can be configured to analyze the text document to determine at least one customer data field in the text document. The processing module can also be configured to match that customer data field to at least one order data field. The data population module can be configured to insert, based on the matching, at least one text value corresponding to the customer data field into the order data field. The purchase order generation module can be configured to generate a purchase order document based on the text value. The purchase order document can include at least one product corresponding to the order data field.

According to another example embodiment of the present disclosure, a method for processing customer orders is provided. The method can include receiving, by a document processing system, a customer document. The method can further include converting, by the document processing system, the customer document into a text document. After the customer document is converted, the method can proceed with analyzing, by the document processing system, the text document to determine at least one customer data field within the text document. The method can further include matching, by the document processing system, the customer data field to at least one order data field. Once the customer data field is matched to the at least one order data field, the method can continue with populating, based on the matching, the order data field with at least one text value corresponding to the customer data field. The method can further include generating, by the document processing system, a purchase order document based on the at least one text value. The purchase order document can include at least one product corresponding to at least one order data field.

According to yet another example embodiment of the present disclosure, the steps of the method for processing customer orders are stored on a non-transitory machine-readable medium comprising instructions, which, when implemented by one or more processors, performs the recited steps.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
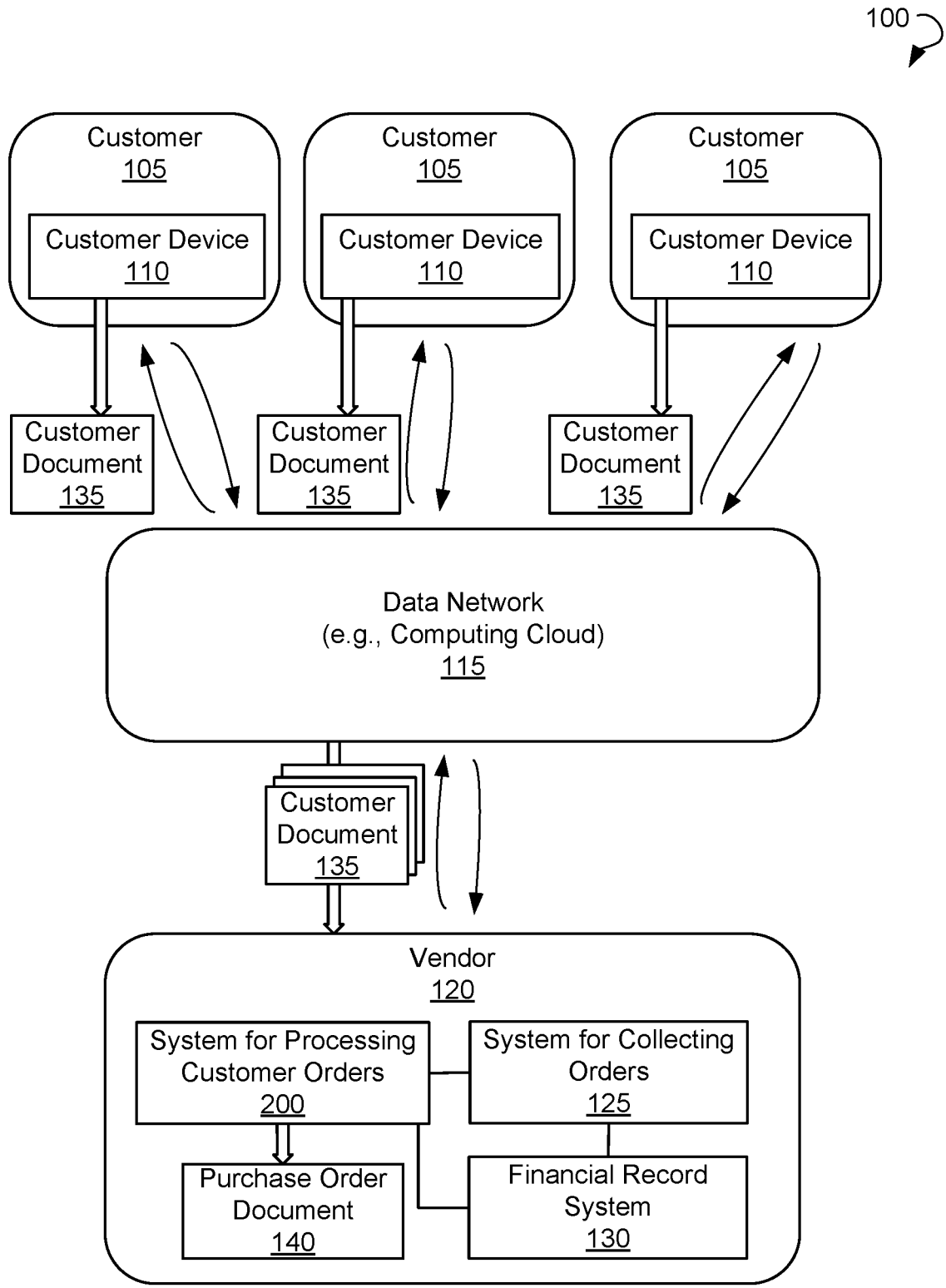
FIG. 1 shows an environment, within which methods and systems for processing customer orders can be implemented, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein can be implemented using a variety of technologies. For example, the methods described herein can be implemented in software executing on a computer system or in hardware utilizing either a combination of microprocessors or other specially designed application-specific integrated circuits, programmable logic devices, or various combinations thereof. In particular, the methods described herein can be implemented by a series of computer-executable instructions residing on a storage medium, such as a disk drive or computer-readable medium. It should be noted that methods disclosed herein can be implemented by a computer (e.g., a desktop computer, a tablet computer, a laptop computer), a cellular phone, a smart phone, a smart television system, and so forth.

As outlined in the summary, the embodiments of the present disclosure are directed to processing customer orders. A customer or a company can desire to place an order via an electronic communication or by entering order information on a vendor website. The customer may provide a purchase order document generated by the customer system using, for example, a document generated by the customer quote request system, a spreadsheet template, and so forth. The generated purchase order document can be in any format, for example, Hypertext Markup Language (HTML) format, Portable Document Format (PDF), image format, spreadsheet format, text format, and so forth.

In one example embodiment, a customer can send the purchase order document to the vendor via email. Upon receipt of the purchase order document, the vendor can automatically process and upload the purchase order document to the vendor system.

In another example embodiment, the customer can upload the purchase order document using a website or a portal of the vendor. A vendor system for processing customer orders can be communicatively coupled to the website of the vendor in order to receive purchase order documents. The vendor system can recognize data in the purchase order document and convert the recognized data into text. Specifically, the vender system can determine relevant data fields in the purchase order document and recognize the text in those data fields.

In some example embodiments, the vendor system can auto-match recognized portions of data from the purchase order document to the records stored in a database of the vendor. Upon a successful match, the system can provide a list of products of the vendor recognized in the purchase order document and store the list of the products in a file having a format compatible with the vendor record system.

In some example embodiments, the system may be unable to recognize some fields in the purchase order document. This can occur when the system cannot identify a portion of the document as a data field. For example, the system may be unfamiliar with the format of the data field. If the system is unable to recognize some data fields in the purchase order document, the system can request that the customer manually input data associated with the product corresponding to the unrecognized data field. The system can then add the product to the list of products.

Furthermore, in some example embodiments, the system can be specifically trained to recognize documents provided by the customer. The customer can provide one or more purchase order documents to the system of the vendor (for example, purchase order documents in any format that the customer uses, for example, an image format, PDF format, spreadsheet format, and the like). The system can then convert the purchase order documents into text documents and create a list of products based on the recognized text. Then, the system can inform the customer that some of the data fields were not recognized and prompt the customer to manually input data related to the products in the unrecognized data fields.

The system can then store the relationship between the unrecognized data field and the product description provided by the customer into a database. If a further purchase order document is received from the customer, the system can recognize the data field of the same type as the previously unrecognized data field and identify the product based on the matching information in the database. Therefore, after receipt and recognition of several unrecognizable documents and corresponding manual input from the customer, the system can be trained to recognize all documents received from the customer, without further need for manual input. Thus, the system can be trained for each specific customer based on documents and manual input received from that specific customer.

Thus, the system for processing customer orders can enable uploading a document in any format directly to the website of the vendor without the need for manual processing and entry of the product information. Therefore, order processing time can be considerably reduced. Manual input may be requested by the system only when data fields in the document of the customer cannot be recognized by the system. Once these documents are recognized, subsequent documents in the same format can be recognized using relationships stored in the database. Therefore, the customer is no longer required to provide input associated with the same unrecognizable data fields in subsequent documents. Using the list of the customer products, a purchase order document can be generated and provided to the vendor. The purchase order document can be in a format compatible with the system of records of the vendor.

Referring now to the drawings, FIG. 1 illustrates an environment 100 within which methods and system for processing customer orders can be implemented. The environment 100 can include one or more customer device(s) 110 of customer(s) 105. The environment 100 can further include a data network 115, at least one vendor 120, and a system 200 for processing customer orders associated with the vendor 120. The system 200 for processing customer orders is also referred herein to as a document processing system. The vendor 120 can further have a system of records, shown as a financial record system 130.

In some embodiments, the customer(s) 105 can be a person or company that can desire to place an order for products or services provided by the vendor 120. The customer(s) 105 can use one or more customer device(s) 110. The customer device(s) 110 can be any device available for use by the customer(s) 105, such as a smartphone, a tablet computer, a laptop computer, a desktop computer, and so forth. In certain embodiments, the customer(s) 105 can use the customer device(s) 110 to access the data network 115, for example, by using a web browser running on the customer device(s) 110. The customer(s) 105 can place the order by providing a customer document 135 to the vendor 120 via the data network 115 and using the customer device 110.

The data network 115 can include the Internet, a computing cloud, and any other network capable of communicating data between devices. Suitable networks can include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications can also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of Recommended Standard 232 (RS-232) serial connection, an IEEE-1394 (FireWire) connection, a Fiber Channel connection, an IrDA (infrared) port, a Small Computer Systems Interface connection, a Universal Serial Bus connection or other wired or wireless, digital or analog interface or connection, mesh or Digi® networking. The data network can include a network of data processing nodes, also referred to as network nodes, that are interconnected for the purpose of data communication.

The systems and methods described herein can also be practiced in a wide variety of network environments (represented by the data network 115) including, for example, Transmission Control Protocol/Internet Protocol-based networks, telecommunications networks, wireless networks, and the like. In addition, the computer program instructions can be stored in any type of computer-readable media. The program can be executed according to a variety of computing models including a client/server model, a peer-to-peer model, on a stand-alone computing device, or according to a distributed computing model in which various functionalities described herein can be effected or employed at different locations.

In some embodiments, the data network 115 being the computing cloud can include computing resources (hardware and software) available at a remote location and accessible over a network (for example, the Internet). The computing cloud can be shared by multiple users and can be dynamically re-allocated based on demand. The computing cloud can include one or more server farms/clusters including a collection of computer servers which can be co-located with network switches and/or routers. In various embodiments, the customer device(s) 110 and the vendor 120 can be connected to the computing cloud via one or more wireless network(s).

In various embodiments, the vendor 120 can include a person or an entity that provides products or services. The vendor can have a system 125 for collecting orders (for example, a website of the vendor 120 on which the customer(s) 105 can place orders). A system 125 for collecting orders can be connected to the system 200 for processing customer orders to provide conversion of customer documents 135 provided by the customer(s) 105 into a purchase order document 140 for the vendor 120. The system 125 for collecting orders and the system 200 for processing customer orders of the vendor 120 can also be connected to a financial record system 130 of the vendor. The financial record system 130 can be a system of records responsible for collecting data from multiple sources, processing the data, and presenting the data for use by the vendor 120. In an example embodiment, the financial record system 130 can store data related to products and services provided by the vendor 120, prices, delivery of products and services, customers, and so forth.

Figure 2:
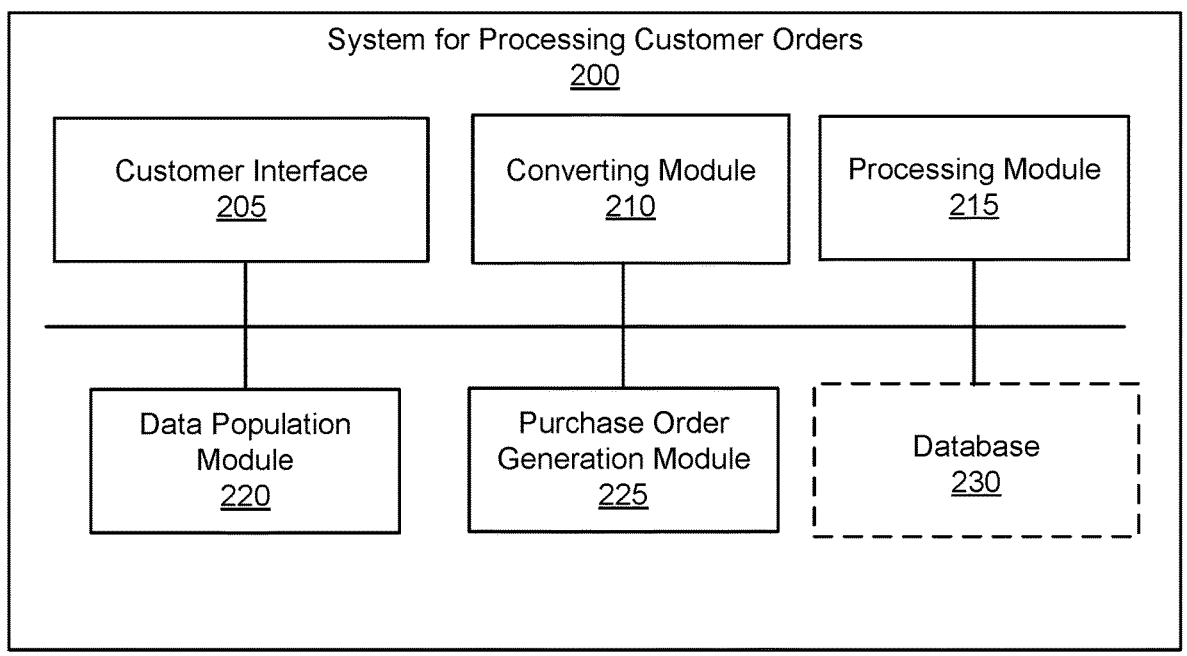
FIG. 2 is block diagram illustrating a system for processing customer orders, according to an example embodiment.

FIG. 2 is a block diagram showing a system 200 for processing customer orders, according to an example embodiment. The system 200 can include a customer interface 205, a converting module 210, a processing module 215, a data population module 220, a purchase order generation module 225, and optionally a database 230. The system 200 can also include additional or other components necessary for operations of document processing systems. In other embodiments, the system 200 can include fewer components that can perform similar or equivalent functions to those depicted in FIG. 2.

The customer interface 205 can be configured to receive customer documents of a user from the computing cloud 115. In some embodiments, the customer interface 205 can be associated with a website of a vendor. The website can have a document upload function which the customer can use to upload the customer documents to the website. In an example embodiment, the customer interface 205 can be further configured to facilitate a manual upload of the customer document to the website and facilitate receipt of the customer document from the user via email.

The converting module 210 can be configured to convert the customer document received via the customer interface 205 into a text document. In example embodiments, the converting module 210 can include an Optical Character Recognition (OCR) software tool, a scanner, and so forth. The converting module 210 can read the customer document, recognize the text in the customer document, and generate the text document based on the recognized text.

The processing module 215 can include hardware and/or software and can be configured to analyze the text document in order to determine at least one customer data field in the text document. Specifically, the processing module 215 can determine the at least one customer data field that contains data related to a product, such as a product number. The processing module 215 can be configured to match at least one customer data field to at least one order data field. The at least one order data field can be a data field that includes data related to products of the vendor and is stored in the system of records of the vendor.

In an example embodiment, the processing module 215 can be configured to determine that the at least one customer data field cannot be automatically matched to the at least one order data field. Based on the determination, the processing module 215 can prompt a user to manually match the at least one customer data field to the at least one order data field. More specifically, the user can be prompted to manually enter data of the at least one customer data field (for example, via a customer interface 205).

Additionally, based on such determination that the at least one customer data field cannot be automatically matched to the at least one order data field, the processing module 215 can create at least one additional order data field and store data manually provided by the user to the at least one additional order data field.

The data population module 220 can be configured to insert, based on the matching performed by the processing module 215, at least one text value corresponding to at least one customer data field into at least one order data field.

The purchase generation module 225 can be configured to generate a purchase order document based on the at least one text value. The purchase order document can include at least one product corresponding to the at least one order data field. The data population module 220 can be further configured to insert the purchase order document into a financial record system to provide pricing information to each of the user and the vendor based on the purchase order. The pricing information can be provided to the user in response to receiving the customer document from the user. In an example embodiment, the financial record system can include one of an Enterprise Resource Planning (ERP) system, an accounting system, an order processing system, and so forth.

The database 230 can store at least one relationship associated with a manual match between the customer data field and the order data field. The processing module 215 can be trained based on the relationship to automatically recognize the customer data fields.

Figure 3:
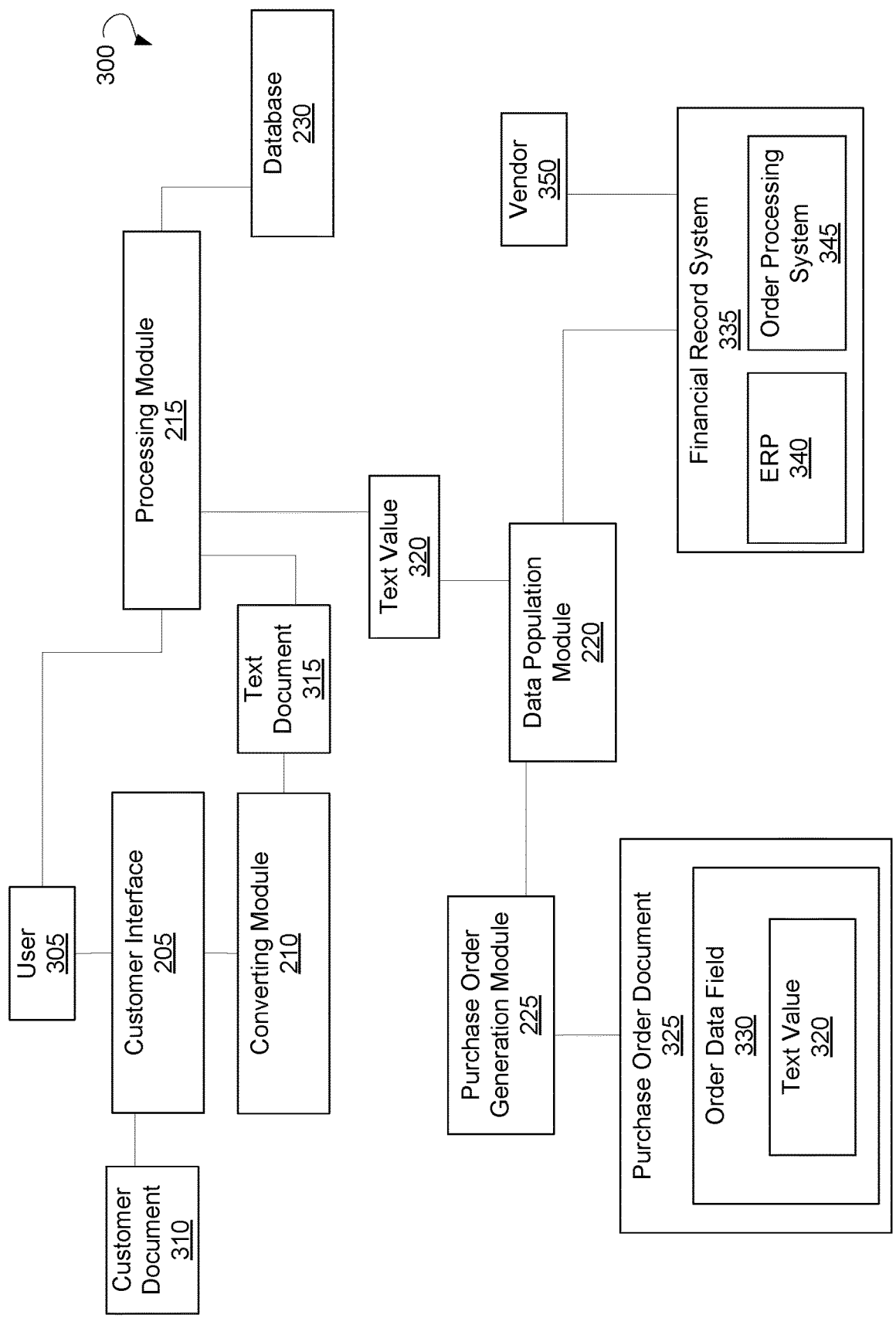
FIG. 3 is block diagram illustrating conversion of a customer document into a purchase order document, according to an example embodiment.

FIG. 3 is a block diagram 300 illustrating conversion of a customer document into a purchase order document for a vendor. A user 305 can be a customer that wishes to place an order for one or more products or services of a vendor 350. The user 305 can upload a customer document 310 using a customer interface 205. The customer document 310 can be a purchase order document or a spreadsheet template generated by a system of record of the user 305, or a document generated by a quote request system of the user 305. In some example embodiments, the user 305 can send the customer document 310 to the vendor 350 via email. The vendor 350 can upload the customer document 310 received via email for processing by the converting module 210.

The customer interface 205 can provide the customer document 310 received from the user 305 to the converting module 210 for converting the customer document 310 into a text document 315. The converting module 210 can parse the customer document 310 and determine regions of patterns in the customer document 310 that contain text. The processing module 215 can analyze the text document 315 by analyzing each line of patterns in the customer document 310 that contain text. Based on the analysis, the processing module 215 can determine that the text document 315 comprises one or more customer data fields. The processing module 215 can recognize the one or more customer data fields based on the format of data fields, type of data present in the data fields, layout of the text document, and so forth. The processing module 215 can match the customer data fields to order data fields. In an example embodiment, the order data fields can be data fields configured to store data related to products of the vendor 350, such as number, description, delivery information, and so forth. In an example embodiment, the order data fields can be data fields having a format that is native to a format of the system of records of the vendor 350. The order data fields can have a specific format, for example, number format, text format, image format, or any other format, configured to store the data associated with the products. In an example embodiment, the order data fields can be stored in the database 230.

Therefore, the processing module 215 can match the customer data fields to the order data fields of the system of records of the vendor 350 to determine whether the customer data fields contain data related to the products of the of the vendor 350. When the match is found, i.e., when it is determined that the customer data fields of the text document 315 include data related to the products stored in the order data fields, the processing module 215 can determine metadata present in the customer data fields. The metadata can include text values 320 corresponding to the at least one customer data field. The processing module 215 can provide the text values 320 to the data population module 220. The data population module 220 can populate the order data fields with the text values 320 corresponding to the customer data fields.

The purchase order generation module 225 can generate a purchase order document 325 for the vendor 350 based on the text values 320 populated in the order data fields. Specifically, the purchase order generation module 225 can use the order data fields populated with the text values 320 to generate the purchase order document 325. The purchase order document 325 can include an order data field 330 that can contain the text value 320, e.g., a product number, related to at least one product of the vendor 350.

In some embodiments, the processing module 215 can be unable to recognize one or more text values in the text document 315. The impossibility for the processing module 215 to recognize the text values can be caused by the quality of the customer document 310, specific format of the customer document 310, specific symbols used by the user 305 in the customer document 310, language of the customer document 310, and so forth. Therefore, if recognition of the customer data fields in the customer document 310 and matching of the customer data fields with order data fields does not result in determining text values of the customer data fields, the processing module 215 can prompt the user 305 to manually input the text value 320 using the customer interface 205. Specifically, upon the prompt by the processing module 315, the user 305 can be presented a screen for manual input, by the user 305, of the text value that matches the customer data field of the text document 315. In an example embodiment, the user can type a product code that was not recognized in the customer data field of the text document 315.

In example embodiments, the customer data field and the text value manually inputted by the user 305 for a customer data field are stored to the database 230 as a match. The matches stored in the database 230 can be used to train the processing module 215 to automatically recognize the same or similar customer data fields that can be present in further customer documents of the user 305.

Specifically, based on the match, the processing module 215 can create an additional order data field in the system of records of the vendor 350 and store the customer data field that cannot be recognized in the additional order data field. Additionally, the processing module 215 can store the text value manually inputted by the user 305 for the unrecognized customer data field. Therefore, next time the user 305 submits a customer document that contains a customer data field that is identical or similar to the customer data field unrecognized in the first customer document, the processing module 215 can find the matching text value in the database 230 for the customer data field. Specifically, the matching text value for the customer data field is the text value manually inputted by the user 305 during submission of the first customer document shown as the customer document 310.

Therefore, the system for processing customer orders of the vendor 350 can be trained to recognize customer documents. The training can be performed by storing a match for an unrecognized customer data field and a text value manually typed by the user 305. According to an example embodiment, the training can be performed by an artificial intelligence engine that can utilize statistical methods, computational intelligence, machine learning, mathematical optimization, logic methods, probability-based methods, and so forth.

In an example embodiment, the user 305 can submit a number of customer documents to train the system for processing customer orders of the vendor 350 to recognize customer data fields and derive text values that correspond to products of the vendor. For example, the user 305 can upload a plurality of customer documents in all formats used by the user 305. The user 305 can be prompted to provide a manual input in respect to the customer data fields that cannot be recognized. The match between the unrecognized customer data fields and the text values manually inputted by the user 305 is stored in the database 230 and is used for recognition for further customer documents that can be provided the user 305 later. In some embodiments, the system for processing customer orders of the vendor 350 can be trained to recognize all possible customer data fields of this specific user 305. Therefore, after training of the system for processing customer orders, the manual input of the user 350 may not be needed because all customer data fields can be successfully recognized by the system for processing customer orders of the vendor 350.

In some embodiments, the data population module 220 can insert the purchase order document 325 into a financial record system 335 of the vendor 350. In some embodiments, the financial record system 335 can include an ERP system 340, an order processing system 345, and any other system used by the vendor to manage orders and store information on the orders and products. The purchase order document 325 can have a format that is compatible with the financial record system 335 of the vendor 350.

Thus, the users, i.e., the customers, can upload customer documents to turn the customer documents into purchase orders and save data entry time and manual input errors. The customers can also upload customer documents to the website of the vendor 350 to submit purchase orders and get immediate pricing confirmations related to the products present in the customer documents.

Figure 4:
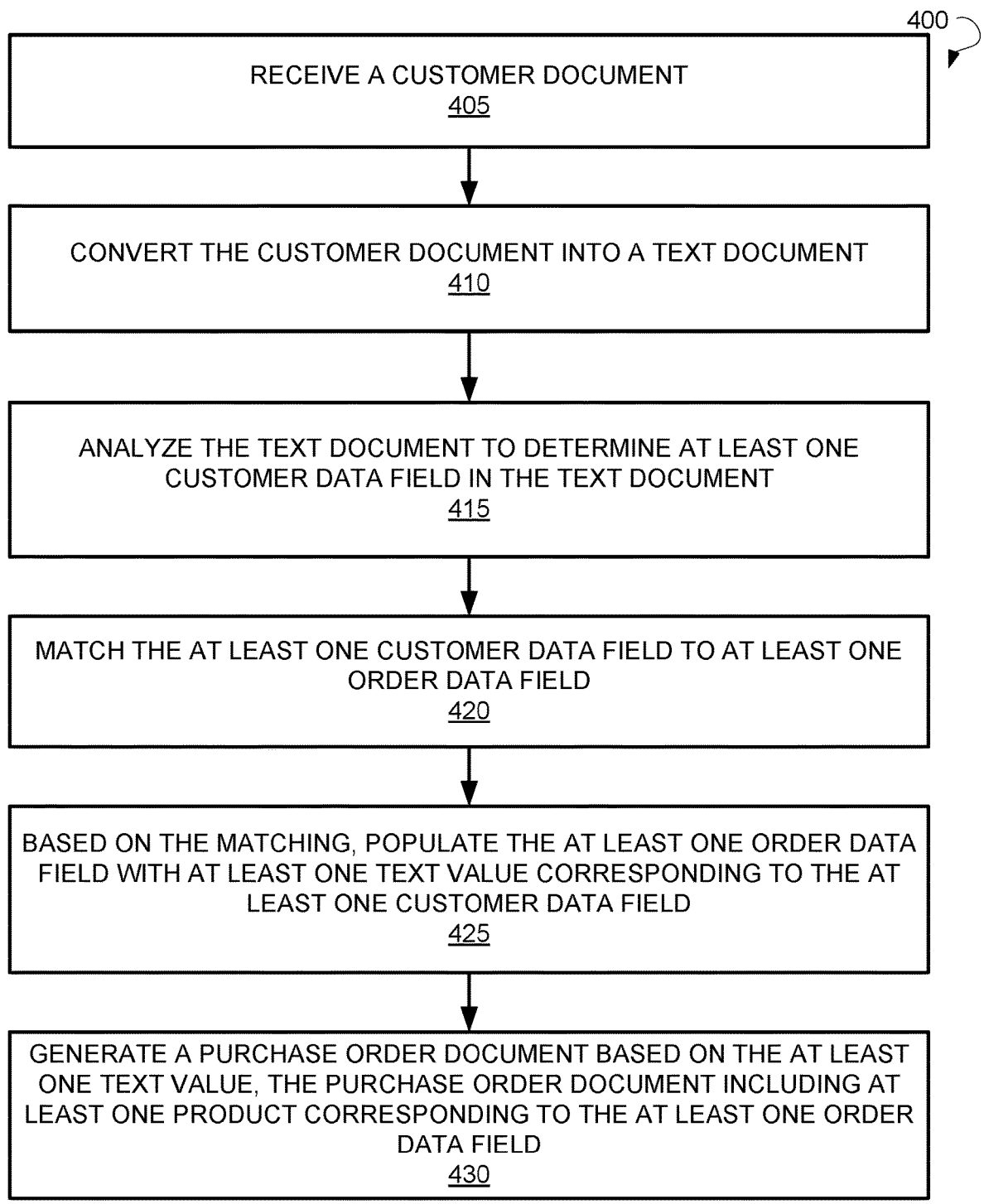
FIG. 4 is a flow chart showing steps of a method for processing customer orders, according to an example embodiment.

FIG. 4 is a flowchart showing steps of a method 400 for processing customer orders, according to some example embodiments. The method 400 can be performed using components of the system 200 described in FIG. 2.

The method 400 can commence with receiving, by a document processing system, a customer document at step 405. In an example embodiment, the customer document can be received based on a manual upload of the customer document to a website by a user. In a further example embodiment, the customer document can be received via email. The customer document can include at least one of the following: an HTML file, a PDF file, an image file, a spreadsheet file, and so forth.

The method 400 can continue with converting the customer document into a text document at step 410. The method 400 can further include analyzing the text document to determine at least one customer data field in the text document at step 415.

At step 420, the method 400 can include matching at least one customer data field to at least one order data field. The method can continue with populating, based on the matching, the order data field with at least one text value corresponding to at least one customer data field at step 425.

At step 430, the method 400 can include generating a purchase order document based on the at least one text value. The purchase order document can include at least one product corresponding to the at least one order data field. In some embodiments, pricing information related to the products present in the purchase order document can be provided to the user in response to receipt of the customer document from the user. Additionally, the purchase order document provided to the vendor can include pricing information associated with the products present in the purchase order document.

The method 400 can further include inserting the purchase order into a financial record system. The financial record system can be associated with the vendor and can store data related to orders and products of the vendor.

In an example embodiment, the method 400 can further include determining that the at least one customer data field is not automatically matched to the at least one order data field. Based on such determination, the user can be prompted to manually match at least one customer data field to the at least one order data field (i.e., to manually input data present in the at least one customer data field).

In a further example embodiment, the method 400 can include determining that the at least one customer data field cannot be matched to the at least one order data field. Based on such determination, at least one additional order data field can be created. The data manually provided by the user can be stored in the additional order data field.

Figure 5:
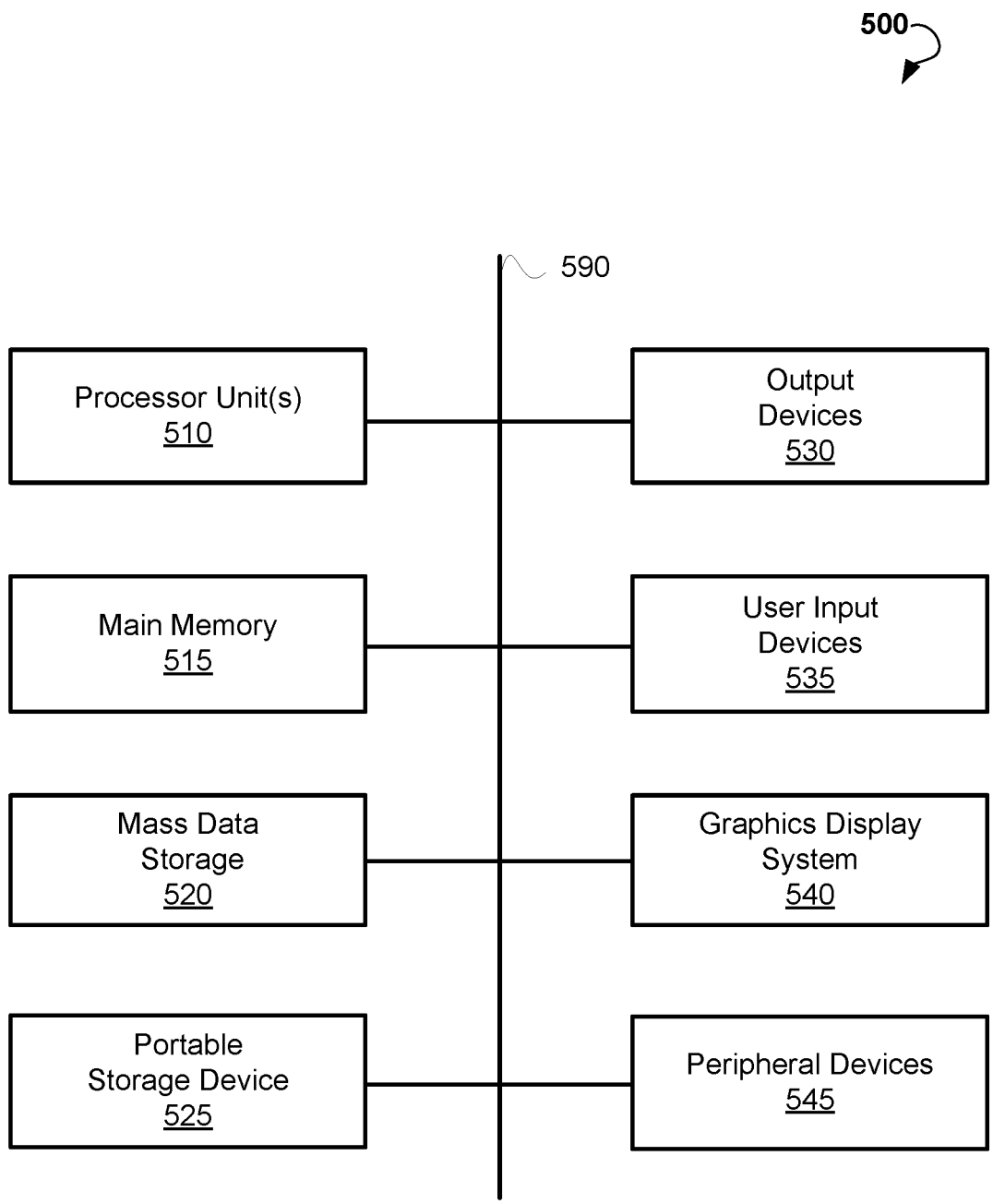
FIG. 5 is a diagrammatic representation of a computing device for a machine, within which a set of instructions for causing the machine to perform any one or more of the methodologies discussed herein can be executed.

FIG. 5 illustrates an example computer system 500 that can be used to implement some embodiments of the present disclosure. The computer system 500 of FIG. 5 can be implemented in the contexts of the likes of computing systems, networks, servers, or combinations thereof. The computer system 500 of FIG. 5 includes one or more processor units 510 and main memory 515. Main memory 515 stores, in part, instructions and data for execution by processor units 510. Main memory 515 stores the executable code when in operation, in this example. The computer system 500 of FIG. 5 further includes a mass data storage 520, portable storage device 525, output devices 530, user input devices 535, a graphics display system 540, and peripheral devices 545.

The components shown in FIG. 5 are depicted as being connected via a single bus 590. The components can be connected through one or more data transport means. Processor unit 510 and main memory 515 are connected via a local microprocessor bus, and the mass data storage 520, peripheral device(s) 545, portable storage device 525, and graphics display system 540 are connected via one or more input/output (I/O) buses.

Mass data storage 520, which can be implemented with a magnetic disk drive, solid-state drive, or an optical disk drive, is a non-volatile storage device for storing data and instructions for use by processor unit 510. Mass data storage 520 stores the system software for implementing embodiments of the present disclosure for purposes of loading that software into main memory 515.

Portable storage device 525 operates in conjunction with a portable non-volatile storage medium, such as a flash drive, floppy disk, compact disk, digital video disc, or Universal Serial Bus (USB) storage device, to input and output data and code to and from the computer system 500 of FIG. 5. The system software for implementing embodiments of the present disclosure is stored on such a portable medium and input to the computer system 500 via the portable storage device 525.

User input devices 535 can provide a portion of a user interface. User input devices 535 can include one or more microphones, an alphanumeric keypad, such as a keyboard, for inputting alphanumeric and other information, or a pointing device, such as a mouse, a trackball, stylus, or cursor direction keys. User input devices 535 can also include a touchscreen. Additionally, the computer system 500 as shown in FIG. 5 includes output devices 530. Suitable output devices 530 include speakers, printers, scanners, network interfaces, and monitors.

Graphics display system 540 includes a liquid crystal display (LCD) or other suitable display device. Graphics display system 540 is configurable to receive textual and graphical information and processes the information for output to the display device.

Peripheral devices 545 can include any type of computer support device to add additional functionality to the computer system.

The components provided in the computer system 500 of FIG. 5 are those typically found in computer systems that can be suitable for use with embodiments of the present disclosure and are intended to represent a broad category of such computer components that are well known in the art. Thus, the computer system 500 of FIG. 5 can be a personal computer (PC), handheld computer system, telephone, mobile computer system, workstation, tablet, phablet, mobile phone, server, minicomputer, mainframe computer, wearable, or any other computer system. The computer can also include different bus configurations, networked platforms, multi-processor platforms, and the like. Various operating systems can be used including UNIX, LINUX, WINDOWS, MAC OS, PALM OS, QNX ANDROID, IOS, CHROME, TIZEN, and other suitable operating systems.

The processing for various embodiments can be implemented in software that is cloud-based. In some embodiments, the computer system 500 is implemented as a cloud-based computing environment, such as a virtual machine operating within a computing cloud. In other embodiments, the computer system 500 can itself include a cloud-based computing environment, where the functionalities of the computer system 500 are executed in a distributed fashion. Thus, the computer system 500, when configured as a computing cloud, can include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources can be utilized exclusively by their owners, or such systems can be accessible to outside users who deploy applications within the computing infrastructure to obtain the benefit of large computational or storage resources.

The cloud can be formed, for example, by a network of web servers that comprise a plurality of computing devices, such as the computer system 500, with each server (or at least a plurality thereof) providing processor and/or storage resources. These servers can manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for processing customer orders have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for processing customer orders, the method comprising:
   receiving, by a processor associated with a document processing system, a customer document, the document processing system being associated with a vendor;
   identifying, by the processor, a customer associated with the customer document;
   converting, by the processor, the customer document into a text document;
   identifying, by the processor, in the customer document, a plurality of regions that include text;
   extracting, by the processor, the text from the plurality of regions;
   determining, by the processor, that one or more of the plurality of regions remain unidentified;
   prompting, by the processor, the customer to manually input text associated with the one or more of the plurality of regions remaining unidentified;
   training the document processing system based on the manual input of the customer to identify the unidentified regions of the customer document;
   based on the training:
      extracting the text from the plurality of regions; and
      identifying the text automatically;
   matching, by the processor, one or more lines of the text to a plurality of order data fields, the plurality of order data fields being stored in records of the vendor and including data related to a plurality of products of the vendor, each of the plurality of order data fields storing at least one text value;
   based on the matching, identifying, by the processor, at least one customer data field in the one or more lines of the text;
   upon the identification of the at least one customer data field, determining, by the processor, the at least one text value corresponding to the at least one customer data field; and
   generating, by the processor, a purchase order document including at least one order data field by populating the at least one order data field with the at least one text value corresponding to the at least one customer data field.

2. The method of claim 1, further comprising:
   determining, by the processor, that the at least one customer data field is not automatically identified in association with the at least one order data field; and
   based on the determination, prompting, by the processor, the user to manually match the at least one customer data field to the at least one order data field.

3. The method of claim 2, further comprising:
   storing, by the processor, at least one relationship associated with the manual match between the at least one customer data field and the at least one order data field in a database; and
   wherein the document processing system is trained to automatically identify the at least one customer data field based on the at least one relationship.

4. The method of claim 3, further comprising:
   determining, by the processor, that the at least one customer data field cannot be matched to the at least one order data field; and
   based on the determination, creating, by the processor, at least one additional order data field.

5. The method of claim 1, further comprising inserting, by the processor, the purchase order document into a financial record system.

6. The method of claim 5, wherein the financial record system includes one of an Enterprise Resource Planning (ERP), an accounting system, and an order processing system.

7. The method of claim 1, wherein the receiving of the customer document includes a manual upload of the customer document to a website.

8. The method of claim 1, wherein the receiving of the customer document includes receiving the customer document via email.

9. The method of claim 1, further comprising providing pricing information based on the purchase order document.

10. The method of claim 1, wherein the customer document includes at least one of the following: an Hypertext Markup Language (HTML) file, a Portable Document Format (PDF) file, an image file, and a spreadsheet file.

11. A system for processing customer orders, the system comprising:
a customer interface associated with the document processing system, the document processing system being associated with a vendor, the customer interface being configured to:
receive a customer document; and
identify a customer associated with the customer document;
a converting module configured to:
convert the customer document into a text document;
identify, in the customer document, a plurality of regions that include text;
extract text from the plurality of regions; and
determine that one or more of the plurality of regions remain unidentified;
a processing module configured to:
prompt the customer to manually input text associated with the one or more of the plurality of regions remaining unidentified;
train the document processing system based on the manual input of the customer to identify the unidentified regions of the customer document;
based on the training:
extract the text from the plurality of regions; and
identify the text automatically;
match one or more lines of the text to a plurality of order data fields, the plurality of order data fields being stored in records of the vendor and including data related to a plurality of products of the vendor, each of the plurality of order data fields storing at least one text value;
a data population module configured to:
identify, based on the matching, at least one customer data field in the one or more lines of the text; and
upon the identification of the at least one customer data field, determine the at least one text value corresponding to the at least one customer data field; and
a purchase order generation module configured to generate a purchase order document including at least one order data field by populating the at least one order data field with the at least one text value corresponding to the at least one customer data field.

12. The system of claim 11, wherein the processing module is further configured to:
determine that the at least one customer data field is not automatically identified in association with the at least one order data field; and
based on the determination, prompt the user to manually match at least one customer data field to the at least one order data field.

13. The system of claim 12, further comprising:
a database to store at least one relationship associated with the manual match between the at least one customer data field and the at least one order data field, the processing module being trained based on the at least one relationship to automatically identify the at least one customer data field.

14. The system of claim 13, wherein the processing module is further configured to:
determine that the at least one customer data field cannot be matched to the at least one order data field; and
based on the determination, create at least one additional order data field.

15. The system of claim 11, wherein the data population module is further configured to insert the purchase order document into a financial record system to provide pricing information based on the purchase order document.

16. The system of claim 15, wherein the financial record system includes one of an Enterprise Resource Planning (ERP), an accounting system, and an order processing system.

17. The system of claim 11, wherein the data population module is further configured to provide pricing information based on the purchase order document.

18. The system of claim 11, wherein the customer interface is further configured to facilitate a manual upload of the customer document to a website.

19. The system of claim 11, wherein the customer interface is further configured to facilitate receipt of the customer document via email.

20. A non-transitory computer-readable storage medium having embodied thereon instructions, which when executed by at least one processor, perform steps of a method, the method comprising:
receiving, by a processor associated with a document processing system, a customer document, the document processing system being associated with a vendor;
identifying, by the processor, a customer associated with the customer document;
converting, by the processor, the customer document into a text document;
identifying, by the processor, in the customer document, a plurality of regions that include text;
extracting, by the processor, the text from the plurality of regions;
determining, by the processor, that one or more of the plurality of regions remain unidentified;
prompting, by the processor, the customer to manually input text associated with the one or more of the plurality of regions remaining unidentified;
training the document processing system based on the manual input of the customer to identify the unidentified regions of the customer document;
based on the training:
extracting the text from the plurality of regions; and
identifying the text automatically;
matching, by the processor, one or more lines of the text to a plurality of order data fields, the plurality of order data fields being stored in records of the vendor and including data related to a plurality of products of the vendor, each of the plurality of order data fields storing at least one text value;
based on the matching, identifying, by the processor, at least one customer data field in the one or more lines of the text;

upon the identification of the at least one customer data field, determining, by the processor, the at least one text value corresponding to the at least one customer data field; and generating, by the processor, a purchase order document including at least one order data field by populating the at least one order data field with the at least one text value corresponding to the at least one customer data field.

\* \* \* \* \*